United States Patent [19]
O'Flynn

[11] 3,800,214
[45] Mar. 26, 1974

[54] APPARATUS FOR TESTING ENERGIZED AND NON-ENERGIZED ELECTRICAL CIRCUITS

[76] Inventor: J. Murray O'Flynn, 1607 Miami Rd., Orlando, Fla. 32807

[22] Filed: Jan. 31, 1972

[21] Appl. No.: 222,176

[52] U.S. Cl. .............................. 324/51, 324/73 R
[51] Int. Cl. ........................................... G01r 31/02
[58] Field of Search .................... 324/51, 63, 66, 73

[56] References Cited
UNITED STATES PATENTS

| | | | |
|---|---|---|---|
| 3,639,833 | 2/1972 | Tachick | 324/51 |
| 2,862,179 | 11/1958 | Murphy | 324/66 X |
| 3,141,128 | 7/1964 | Behr | 324/51 |
| 3,176,219 | 3/1965 | Behr | 324/51 |
| 3,217,244 | 11/1965 | Glover | 324/51 |
| 3,648,163 | 3/1972 | Pinner et al. | 324/51 |
| 3,368,146 | 2/1968 | Regan et al. | 324/51 |
| 3,643,157 | 2/1972 | Ettelman | 324/51 |
| 3,651,399 | 3/1972 | Florance et al. | 324/51 |

FOREIGN PATENTS OR APPLICATIONS

| | | | |
|---|---|---|---|
| 956,913 | 4/1964 | Great Britain | 324/51 |

*Primary Examiner*—Gerard R. Strecker
*Attorney, Agent, or Firm*—A. Yates Dowell, Jr.

[57] ABSTRACT

An electrical testing device for determining the correct connection and faults in electrical circuits such as electrical wiring in buildings and equipment connected thereto. The device comprises an instrument having a measuring and indicating ammeter and a test connection cord comprising a plurality of conductors for connecting the device to circuits to be tested and adjustable resistors for controlling the internal resistance of the instrument and of the instrument and test cord combined. A plurality of switching means provides for connecting the ammeter and the adjustable resistances in circuit with an electrical energy source, such as a battery, for determining the continuity of the electrical circuits being tested and the nature and location of faults in the tested circuit and the equipment connected thereto.

7 Claims, 7 Drawing Figures

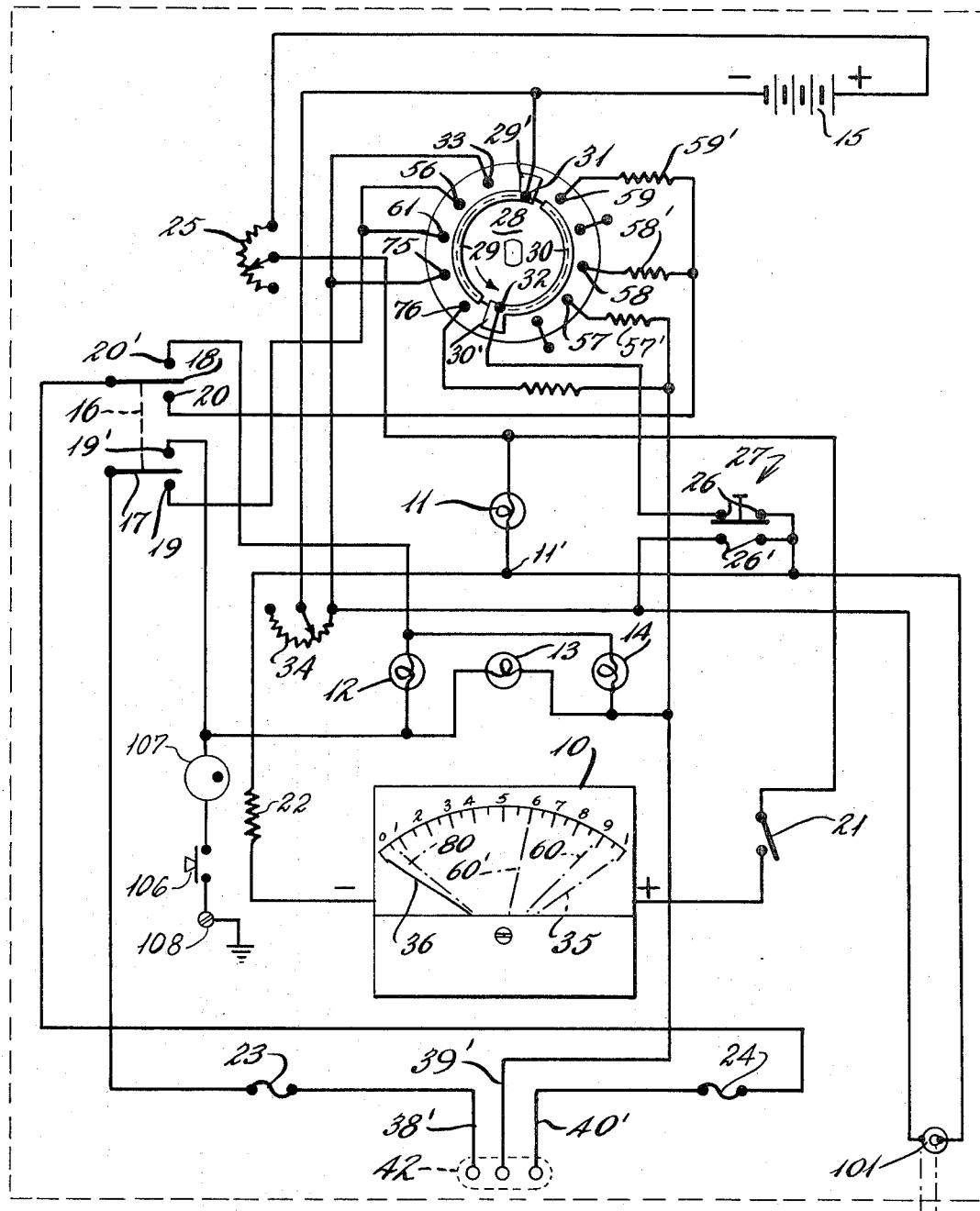
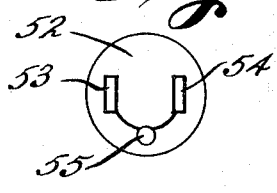

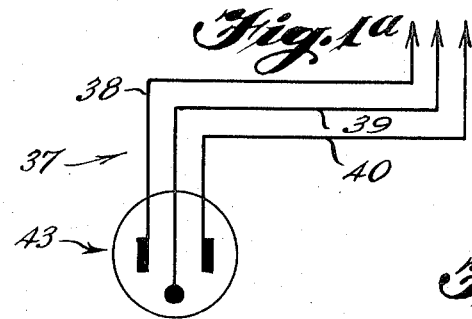
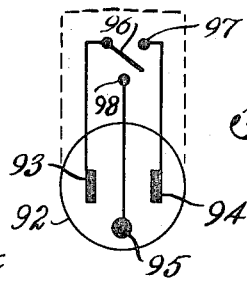
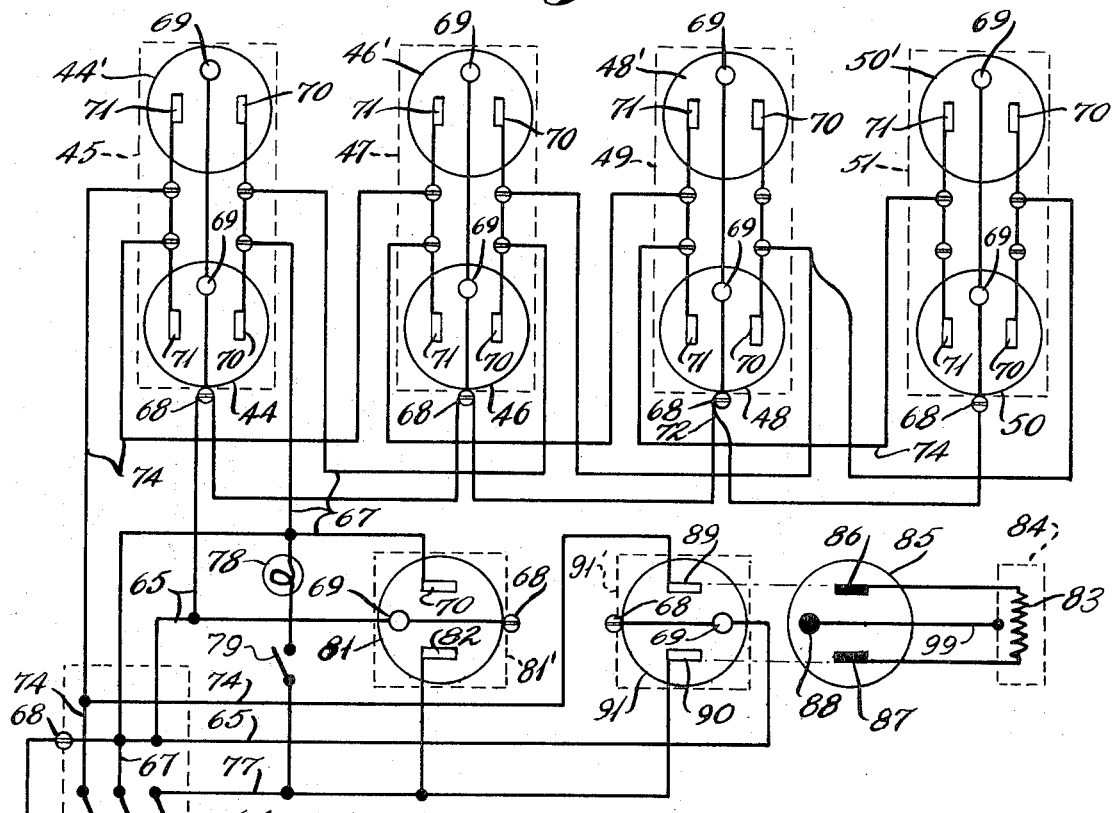
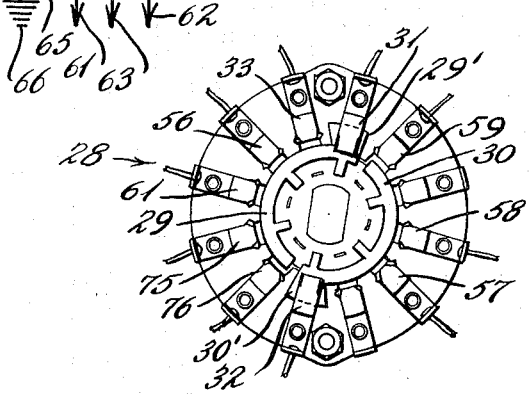
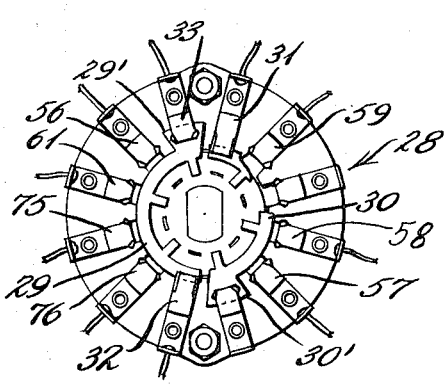

3,800,214

APPARATUS FOR TESTING ENERGIZED AND NON-ENERGIZED ELECTRICAL CIRCUITS

FIELD OF THE INVENTION

This invention relates to apparatus and methods for testing electrical circuits and particularly to apparatus and methods for testing the wiring of buildings and equipment connected thereto for the direction of faults in the wiring and the equipment and in the connections therebetween.

BACKGROUND OF THE INVENTION

Electrical installations such as the wiring circuits in buildings and various types of electrical equipment connected thereto are regularly inspected before a permit is granted for the use of the electrical installation in order to minimize the possibility of injury to persons using the electric circuits and equipment and to minimize damage which might result from faulty installation of the wiring and faulty equipment or its connection to the wiring circuits. Various types of relatively simple tests and equipment have been used to detect simple grounds or short circuits between the lines supplying power to the electric circuits and to determine possible grounds of the lines which are adapted to be energized when a power source is connected to the electrical installation.

In the past, it has generally been difficult to determine the exact location of a fault in the wiring, such as a ground or a short circuit, unless a relatively complicated bridge test circuit is utilized. In addition, the past testing equipment generally did not detect certain faults, such as loose connections where such loose connections did not actually cause an open circuit in the system. In addition, tests in the past generally did not indicate incorrect polarity of connections which might cause a switch in one location to control a light in another location which it was not intended to control.

Examples of testing equipment known heretofore are disclosed in U.S. Pat. Nos. 1,969,713 — Bullock, 2,366,789 — Horham, 3,317,825 — Huff, and 3,528,104 — Ehlschlager.

SUMMARY OF THE INVENTION

An object of the present invention is to provide an improved electrical testing device which can readily determine faults in an electrical system and indicate the location and nature of a fault.

Another object of the present invention is to provide a simplified and accurate electrical testing device for detecting and locating electrical circuit defects in both electrical circuits which are energized or unenergized by a source of electrical power.

The improved electrical testing device comprises an electrical indicating instrument, such as an indicating ammeter, with means such as a multiple position rotary switch and other switching devices for providing various connections of the ammeter in a testing circuit comprising variable resistors and test connection cords, together with circuit indicating lights, whereby an internal instrument circuit can be energized by a source of electrical energy contained in the instrument to provide a basic or reference ammeter deflection which can be compared to other ammeter deflection readings obtainable by connecting the test cords to various electrical circuits which are to be tested in order to determine whether or not a fault exists in the tested circuits and the nature of the fault as well as the location thereof.

Basically these tests are obtainable by comparing the ammeter reading obtained by energization of an internal instrument circuit when disconnected from a circuit to be tested with the ammeter reading when the test cord is connected to the circuit being tested. If no reading is obtained when the test cord is connected to the tested circuit and the test instrument is energized by its electrical source, the lack of any ammeter reading indicates that the electrical circuit undergoing test is open, whereas an ammeter reading of slightly less than the reference ammeter deflection indicates a ground or short in the tested circuit. The exact ammeter reading is not as important as noting whether or not the reading is equal to or less than the reference deflection. When a lesser reading is obtained, the test cord is disconnected from its original connection and is connected through another adjacent outlet from which another reading is taken. If this reading is still less than the reference ammeter deflection but is greater than the first reading, it indicates that the outlet to which the test cord is connected is nearer to the fault than the original connection. If it is the same as the reference ammeter deflection, it indicates that the fault is in that particular outlet.

In the first instance of this second connection, the location of the fault has not yet been determined and the test cord connection is changed to another adjacent outlet and another reading taken from this outlet. If this reading is greater than the second reading, it indicates that this outlet is nearer to the fault than was the second outlet, whereas if there is a lower reading than the second position reading, it indicates that the outlet is farther from the fault than the second outlet. This procedure is continued until the ammeter reading with the test cord connected to an outlet is equal to the reference ammeter deflection, which indicates that that is the point at which the defect is located. If, however, with all other outlets tested and test cord connection to an outlet and said outlet indicated as being nearest to the fault and the ammeter reading indicated is not quite equal to but slightly less than the reference ammeter deflection, it would indicate the fault to be beyond such outlet but in close proximity thereto, such as in a switch box or fixture box enclosure, or within a conduit connected between two outlet boxes.

The present instrument is adapted for use in either a two-wire or a three-wire electrical system and in a three-wire system the neutral line and the ground line are connected together at the main distribution box or bus of the installation. The instrument is provided with circuit switching means which can connect the indicating ammeter in series with the hot or positive side of the electrical energy source and the neutral and ground lines in series, as well as in series with the hot line and only the neutral line so as to determine whether or not the fault is in the ground or neutral line. Provision also is made for connecting the ammeter in series with the electrical source of power and the ground and neutral lines with the connection to the hot line to determine whether or not the polarity connections of the tested system are correct.

In addition, testing for the circuit continuity of a high voltage circuit and equipment connected thereto can be made by further switching circuis in the instrument and through the indicating ammeter. Further indication of certain circuits is provided by an electric light connected across the ammeter to give a visual indication of the presence of current in the various circuits energized by the electrical energy source of the instrument. Additional electric lights are provided which are adapted to be energized by power circuit voltages, and switching is provided for connecting these lights through the test cord for determining energization of various outlets, lights, and equipment in the circuit undergoing test when such a circuit is energized from an external power source. Suitable switching circuits also are provided for determining the correct polarity of such energized outlets and equipment connections. A suitable ground circuit probe also is provided for testing the proper grounding of connected electrical equipment and apparatus in the circuit being tested.

Further objects and advantages of this invention will be apparent from the following description referring to the accompanying drawings, and the features of novelty which characterize this invention will be pointed out with particularity in the claims appended to and forming a part of this specification.

BRIEF DESCRIPTION OF FIGURES OF DRAWINGS

In the drawings,

FIG. 1 is a schematic circuit diagram illustrating an embodiment of an improved electrical testing device in accordance with the present invention and particularly showing the connections of the instrument, the ground test probe and attachment cord, and one end of the test connection cord.

FIG. 1a schematically illustrates the outer end of the test connection cord as continued from FIG. 1 and the male plug of this cord.

FIG. 2 illustrates a plan view of a two-pole, make before break, shorting type, multiple position wafer switch, schematically illustrated in FIG. 1, shown with the two poles in the off position as in FIG. 1.

FIG. 3 is a plan view of the same wafer switch shown in FIGS. 1 and 2, with the two poles turned to the first position from the off position of FIGS. 1 and 2 to illustrate how connections are made in this type switch, and with a part of one of the poles broken away to illustrate more clearly the relatively rotatable arrangement of the major parts of the switch.

FIG. 4 is a schematic diagram illustrating an electric circuit, such as a house wiring system, which may be tested by the electrical testing device of the present invention.

FIG. 5 illustrates a male plug with a shorting switch which forms part of the present invention and is used in connection with the instrument shown in FIG. 1 for testing the high voltage section of a system, such as that shown in FIG. 4 and for open circuits.

FIG. 6 schematically illustrates a female plug, with all of its contacts short circuited, which is adapted to be used in connection with the device of the present invention illustrated in FIGS. 1 and 1a in connection with the determination of the reference ammeter deflection.

DETAILED DESCRIPTION OF THE INVENTION

Referring to the drawings, FIG. 1 illustrates an improved electrical testing device particularly adapted but not limited to testing for the correct connections and faults or defects in electrical wiring systems and equipment as are generally found in residential and business buildings. Wiring of this type in general comprises electrical apparatus and equipment, such as illuminating fixtures, power devices such as motor driven fans, pumps, garbage disposal units, dishwashing devices, clothes washers and dryers, heating apparatus, elevators, and similar units. Much of this type of equipment is permanently connected to the system through various types of switches and control devices which are electrically connected by conductors to the main bus in the distribution supply box.

Generally the system also includes a number of outlet connection sockets to which electrical devices may be connected by suitable plugs, and these outlets generally are of the low voltage type, although a limited number also may be of a higher voltage to supply larger power equipment in heating devices.

Such electrical distribution systems inevitably contain a large number of electrical connections to the different lines or conductors of the system, most of which connections are secured to the electrical outlets or equipment by screws, although in some instances the connections may be made directly by splicing of one line to another. In some instances, the connections made by the screws or by the splices may not be as secure or tight as they should be, thereby resulting is a loose connection which may become overheated by the flow of electric current through the loose connection and may cause damage to the equipment or even cause a fire as a result of the overheating. In some instances a connection may be or become so loose that the outlet or equipment may become entirely disconnected from the system and become inoperative as a result thereof.

In addition to such faulty connections, the polarity of the connections also may be at fault so that a neutral or ground wire may be reversed or may be interchanged with a "hot" or a higher voltage line of the system. In addition, the grounding of power equipment may be omitted or faulty with the result that persons using the equipment may receive injurious or at least annoying shocks when touching the equipment when it is in operation.

In order to eliminate such faults in these electrical system installations, it is desirable that the installation be completely tested for the absence of such faults so that if any are detected they can be corrected before the system is connected to a power system for normal usage. The present electrical testing device is adapted to detect such faults and to determine their location so that correction can be made before the system is energized.

As shown in FIG. 1, the present electrical testing device includes a measuring and indicating ammeter 10 and a plurality of electric lights 11, 12, 13, and 14 which are adapted to be connected in a test circuit to indicate the presence or absence of faults in the circuit being tested and to provide indications which can be compared to determine the nature and location of such faults. The device is adapted to test electrical systems which are connected to power energizing sources, as well as such systems prior to their connection to such power sources.

A self-contained electrical energy source, such as a battery 15, is provided for use in testing deenergized systems, that is, systems which are not connected to an external power source. A double-pole double-throw switch 16 is provided for connecting the electrical testing device to internal circuitry adapted to test systems energized by an external power source, and, alternately, to test deenergized systems not so connected. The two poles 17 and 18 of the switch 16 are adapted to be closed on switch contacts 19 and 20, respectively, for testing a deenergized electrical system and, alternately, to be closed on switch contacts 19' and 20', respectively, for testing an electrical system which is energized by an external electrical power source.

A suitable single pole switch 21 is connected in the circuit to the ammeter 10 in order to connect and disconnect the ammeter from the circuitry of the testing device, and a current limiting resistor 22 is connected in series with the ammeter 10 circuit so as to prevent damage to the ammeter by excessive currents. In most instances, the currents to be measured by the ammeter 10 will be of relatively small value so that a milliammeter is preferably used. Such a milliammeter is a more highly sensitive instrument and therefore can detect relatively small changes in current and provide a better indication of such small changes than a larger current capacity instrument. In addition, suitable fuses 23 and 24 are connected in the test line connecting conductors within the testing instrument which are adapted to be connected to the hot and the neutral lines of a system to be tested so as to provide additional protection to the instrument against excessive currents which might flow therein under certain types of system faults.

Before beginning a test of any particular installation, the testing instrument should be adjusted to assure a desired easy basic or reference ammeter deflection to which various other ammeter readings may then be readily compared. This basic or reference ammeter deflection reading represents the internal resistance of the testing device circuitry which includes the ammeter, various resistances and switching circuits. This reading is obtainable by closing the single pole switch 21 which connects the positive terminal of the ammeter 10 and a terminal of the electric light 11 in series with a variable resistance 25, such as a potentiometer or rheostat, and through this resistance to the positive terminal of the battery 15. The negative terminal of the ammeter 10 is connected to the negative terminal of the battery 15 through the current limiting resistor 22, normally closed contacts 26 of a shorting type push button switch 27, and through a multiple contact rotary wafer-type switch 28. In the illustrated instrument, the wafer-type switch 28 is of the two-pole shorting type, wherein poles 29 and 30 are in the form of substantially semicircular arcuate contactors adapted to engage substantially radially inwardly extending main contacts 31 and 32, and are also provided with outwardly projecting tabs 29' and 30', respectively, which are adapted to engage the other ten shorter contacts of the rotary switch 28. The rotary switch is shown in the off position in FIGS. 1 and 2 with the contacts 31 and 32 in engagement with the pole tabs 29' and 30', respectively, and the remainder of the poles 29 and 30 out of engagement with any other of the rotary switch contacts.

In order to complete the circuit from the negative terminal of the ammeter to the negative terminal of the battery 15 from the push button contacts 26, the rotary switch 28 is turned one step in a counterclockwise direction, as shown by the arrow in the illustrated embodiments, to the position shown in FIG. 3, wherein the switch contact 32 engages switch pole 29 and pole tab 29' engages switch contact 33 connected to a variable resistor 34, such as a potentiometer or rheostat, which is connected to the negative terminal of the battery 15. This position of the rotary switch 28 also completes a circuit through the electric light 11 in parallel with the ammeter circuit and the current limiting resistor 22, such that the current passing through the ammeter and the light 11 together pass through the variable resistors 25 and 34.

In practice, it has been found desirable to use a relatively large ammeter deflection for the reference deflection reading and preferably this is made the maximum deflection of the instrument which, in the illustrated embodiment, is one milliampere, indicated by the dot-dash needle position line 35 of the ammeter needle 36. If the needle 36 does not give a one milliampere reading for this reference circuit of the instrument, the variable resistor 25 may be adjusted until the current through the circuit provides this desired reference deflection 35.

In order to determine the location of a fault in accordance with the present invention, the testing instrument is connected to the circuit to be tested by a general test connection cord 37 comprising a plurality of conductors which are adapted to be connected to corresponding conductors in the circuit to be tested. In the illustrated embodiment the test cord is shown as comprising three conductors 38, 39, and 40, for respectively connecting to the hot or higher voltage line of the system, the ground line of the system, and the neutral line of the system. If the circuit which is being tested is a two-wire system, rather than a three-wire system as shown in the drawings, the test cord would comprise only the conductors 38 and 40.

In order to facilitate handling of the testing device, the general test cord 37 preferably is made readily detachable from the test instrument by providing it with a male plug 41 which can be readily engaged with a complementary female socket 42 in the instrument so that the test cord conductors 38, 39, and 40 are connected directly to the corresponding instrument conductors 38', 39', and 40' in the instrument. The outer end of the test cord 37 also is provided with a male plug 43 which is adapted to be plugged into any suitable complementary outlet socket, which conventionally is of the female type, such as sockets 44 and 44' in outlet connection box 45, sockets 46 and 46' in outlet connection box 47, sockets 48 and 48' in outlet connection box 49, and sockets 50 and 50' in outlet connection box 51.

In order to determine the location of a ground or short circuit fault, the external resistance is balanced against the internal instrument resistance which was used to provide the ammeter reference deflection reading, and when these two resistances are substantially equal, the point of connection to the test cord is the location of the fault. Initially the instrument is zeroed by adjusting the external resistance comprising the test cord, the variable resistor 25 and the connections through the ammeter 10 and the rotary switch 28 to equal the instrument internal resistance comprising the ammeter 10 and the variable resistances 25 and 34 and their connections to the battery 15. This is done by initially short circuiting the test cord through the prongs of its outer male plug 43, which can be conveniently done by simply applying a female socket 52, such as shown in FIG. 6, wherein the three socket terminals 53, 54, and 55 are suitably interconnected.

In order to determine this external resistance of the testing device test cord, the rotary switch 28 is advanced one more position from that shown in FIG. 3, so that the pole tab 28' engages rotary switch contact 56 and the pole 29 engages rotary switch contact 32. In this position, rotary switch pole tab 30' engages rotary switch contact 57 and pole 30 engages rotary switch contact 31. Since the test instrument is not connected to an external circuit energized by an external power source, the double-pole double-throw switch 16 is closed with its poles 17 and 18, respectively, in engagement with its contacts 19 and 20.

In order to obtain an ammeter deflection to check this external test device resistance, the test cord plug 41 is plugged into the instrument socket 42 and the ammeter switch 21 is closed. This provides a circuit from the positive terminal of the battery 15 through the variable resistor 25, the light 11 in parallel with the ammeter circuit through the switch 21 and the current limiting resistor 22, to the normally closed contacts 26 of the push button switch 27, to the rotary switch contact 32, the rotary switch pole 29, the pole tab 29' to the switch contact 56, to double-pole double-throw switch contact 19, switch pole 17, fuse 23, line 38' to the test cord conductor 38, to the short circuit in the female socket 52, and back to the instrument through test cord conductors 39 and 40. Conductor 40 is connected to test instrument conductor 40', which is connected to double-pole double-throw switch pole 18, closed on switch contact 20, which is connected to rotary switch contacts 58 and 59 through resistors 58' and 59', respectively. Since neither rotary switch contact 58 nor 59 engages rotary switch pole tab 30' in this position of the rotary switch 28, neutral line circuit 40 of the test cord is open circuited. The ground line circuit through the test cord conductor 39, connected to the instrument internal line 39', completes the circuit in this position of the rotary switch 28 through its contact 57 in engagement with pole tab 30' and pole 30 in engagement with contact 31 connected to the negative terminal of the battery 15.

If the ammeter needle 36 deflection is less than the reference deflection 35 for this test connection, such as that indicated by dot-dash line 60, the relative internal resistance of the test instrument as controlled by the variable resistors 25 and 34 should be adjusted in order to provide for the same reference deflection as the deflection with this connection of the test cord. This can be done as follows. Turn the rotary switch 28 so that the pole tab 29' engages contact 56, then depress the push button switch 27, so as to open the circuit between its normally closed contacts 26 and closing a circuit through its normally open contacts 26'. This position of the push button switch 27 removes the connection of the external circuit through the test cord conductors and connects the ammeter 10 and light 11 directly through the push button contacts 26' and the variable resistor 34 to the negative terminal of the battery 15. If the ammeter needle 36 does not go to the deflection reading 35, as read when the push button switch 27 was released and in engagement with its contacts 26, the variable resistor 34 should be changed until the deflection of the needle 36 reaches the deflection reading 35, corresponding to the needle deflection with the push button 27 released and in engagement with its contacts 26. The resistance 34 is varied until the ammeter needle deflection remains the same for both positions of the push button switch 27. This will normally be close to the original preset reference deflection reading 35 and will indicate that the external resistance through the test cord is the same as the internal resistance of the instrument through both of its variable resistors 25 and 34 and their respective connections in the instrument through the rotary switch 28 and the switch 16. This can be considered as the zeroed setting of the test device.

With this setting of the various elements of the test device, the short circuiting female socket 52 is removed from the outer test cord plug 53, and the device is ready for use in testing external circuits for possible faults therein. The connection of the test cord plug 43 to an external circuit so that there is resistance between the plug prongs connected to the test cord conductors 38, 39, and 40, will result in an increased resistance in the series circuit including the test cord and the external resistance so that the deflection of the ammeter needle 36 necessarily will be less than the zeroed deflection reading 35 as previously set. This inherent result is utilized both to determine the present of a fault and the location of such a fault.

In order to test an electrical wiring system having a plurality of outlet sockets connected to a dual 115-volt distribution system with a 230-volt power supply between high voltage supply conductors 61 and 62, in which the dual circuit 115-volt distribution lines are connected respectively between high voltage supply line 61 and a mid-voltage or neutral line 63 and the other high voltage line 62 and neutral line 63, as shown in FIG. 4, the test cord plug 43 is inserted in any of the outlet sockets. If this distribution system is not connected to an external power source, as when a building is first wired and before it is connected to the power distribution system lines, the lines 61, 62, and 63 will be deenergized and the wiring can be tested with the test device electric energy source 15. In order to insure that the system is completely disconnected from any power source, it is advisable to make certain that the main switch box switch, such as the main bus three-pole switch 64, is open. In a three-wire distribution system, such as that illustrated in FIG. 4, a ground distribution line 65 is connected to a suitable ground 66 and to the neutral or mid-voltage distribution line 67 in the main bus of the main power switch box, which also is grounded through this conductor. This ground line 65 is normally connected in any suitable manner to each distribution box, as by screws 68, and also connected to a grounding contact 69 of each outlet socket.

Neutral line 67 is normally connected to a neutral contact 70 of each socket so that substantially no potential difference should exist between the socket contacts 69 and 70. The other contact 71 of each of the distribution sockets is adapted to be connected to one of the hot or high voltage lines of the distribution system. In some cases where the high voltage of 230-volt supply lines is not utilized, only one of the high voltage power supply lines 61 or 62 will be adapted to be connected to the wiring of the local system. In most instances where power equipment, such as motorized garbage disposal units, washers, dryers, fans, pumps, or heaters, and similar equipment are utilized, the low voltage outlet sockets will be connected as nearly as possible, half between one of the high voltage supply lines and neutral, and half between the other high voltage supply line and neutral, thereby balancing to some degree the load on each half of the distribution system and minimizing current flow in the neutral conductor. This also provides a more efficient utilization of electrical power as a completely balanced load will result in no current flow in the neutral conductor. In the system illustrated in FIG. 4, a completely balancing even distribution of the outlets is not shown, as this is not needed in order to explain the full operation of the present invention.

The present embodiment of this invention is adapted to test a continuity of electrical circuits, as well as for various types of faults, such as grounds, short circuits, and loose connections which may exist in a wiring system. In order to check all of these tests, the rotary switch 28 is provided with two additional contacts 75 and 76 which provide additional testing circuits, the functions of which will be explained later.

In testing a wiring system, such as that exemplified by the circuit shown in FIG. 4, it is first important to determine whether or not the system is connected to an electrical power energizing source. If it is not yet so connected, the test of the various fixtures and outlets in the system and their connections to the wiring may be begun without any changes or connections being made to the main bus or distribution panel for the system. If a power supply has been connected to the distribution box, an alternate testing procedure may be used. The system may first be checked, while energized, for correct polarity connection and faults, as will be explained later, and then for the location of faults by opening the main bus switch 64, so as to assure complete deenergization from the outside power supply of the system circuitry which is to be tested, or the system may first be thus deenergized and the system tested in this state. The testing device then is zeroed as has been explained to assure that the internal resistance of the instrument and the external resistance through its test cord 37 are substantially the same and to provide a predetermined reference deflection of the ammeter needle 36, preferably substantially a one milliampere deflection.

The 115-volt circuits of the system may be tested with the device by first checking for the continuity of the circuits with the system deenergized. In order to make this test, a jumper is connected across the 230-bolt hot lines 74 and 77 on the system side of the main disconnection switch 64 in the main bus or distribution panel and all of the 115-volt, single-pole branch circuit protective devices of the system are turned to the "on" or closed position. This will connect the two deenergized hot lines of the system circuitry in series. Such a shunt can also be provided by connecting together the two hot lines at any 230-volt power output of the system, although preferably such a connection should be made at the main bus of the system. After this has been done, all of the wall and appliance switches are turned off, so that when the test device test cord plug 43 is plugged into any 115-volt outlet no current should flow through the device to energize the electric light 11 or the ammeter 10.

In order to test the system, it is necessary to provide a circuit therethrough so that current can flow through the testing device and the circuitry of the system. With all of the switches turned off, no such circuit should exist. A connection between the interconnected hot lines 74 and 77 and the neutral line 67 can be provided by turning on an electric light, such as a lamp 78 connected to one of the 115-volt circuits of the system through a switch 79. The closed circuit through the lamp 78 will provide a connection through the jumper and both hot lines 74 and 77 in series with the neutral line 67 of the system for all receptacle outlets throughout the entire system.

In order to check the circuit continuity of the system, the testing device test cord plug 43 is plugged into an outlet socket, such as socket 44, and the rotary switch 28 is turned to place the switch pole tab 29' in engagement with the rotary switch contact 56. With the ammeter switch 21 closed and the double-pole switch 16 closed with its poles 17 and 18 in engagement with its contacts 19 and 20, respectively, a circuit should be established through the testing device and the turned-on lamp 78 with the push button switch 27 in its released position, as shown in FIG. 1. Current should flow in this circuit from the positive terminal of the battery 15 through resistance 25, to light 11 in parallel with closed switch 21, ammeter 10, and resistance 22, through switch 27 closed contacts 26, to rotary switch contact 32, thence through its pole 29 and tab 29' to its contact 56, to switch 16 contact 19 and through its closed pole 17 to line 38', over test cord line 38 to outlet 44 contact 71, over line 74 to the main switch 64 bus, through the jumper connecting line 74 to line 77 at the bus, through line 77 to closed switch 79 and through light 78 to neutral line 67, thence back the main switch 64 neutral line 67 connection to ground line 65, over ground line 65 to outlet 44 contact 69, over connector cord 37 line 39 to instrument line 39' through resistor 57' to rotary switch contact 57, over switch pole tab 30' and pole 30 to contact 31, and back to the negative terminal of battery 15. This should give an indication of a complete circuit by a deflection of the ammeter needle 36 which will be less than the reference deflection 35, and, if the lamp 78 is a small watt lamp, the ammeter needle deflection may be a relatively small value, such as that indicated by the dot-dash line 80. Such a deflection will indicate a continuity of the electrical circuitry through the lamp 78 and the hot lines and the grounding line connected to the outlet socket in which the test cord plug 34, in this case outlet 44, is connected.

The rotary switch 28 is then turned to its next position with its pole tab 29' in engagement with its contact 61, with the switches 16, 21, and 79 remaining in their closed circuit position. If this again provides an ammeter deflection 80, it again indicates a complete circuit through the lamp 78 and the hot line circuit of the system with a return to the testing device through the neutral conductor line 67 of the system and the test cord neutral conductor 40 to the rotary switch contact 58 in engagement with its pole tab 30', its pole 30 to its contact 31, and back to the testing device energy source battery 15. This indicates a continuity of the circuit bein tested through its hot lines and the neutral conductor thereof. The circuits of any other lights connected to the system being tested can be checked similar to this check of the circuit of lamp 78 and switch 79 by successively turning on each such lamp. If the power of each respective lamp is the same as that of lamp 78, the ammeter deflection should in every case be nearly the same since the only variation will be due to a slight increase or decrease in the length of the conductors leading to and from the lamp which has been turned on as compared to the conductors connected to lamp 78.

If no reading or deflection of the ammeter needle 36 is obtained when the rotary switch pole tab 29' is in engagement with its contact 56 while performing the foregoing test with the lamp 78, it is an indication that the ground conductor of the system being tested is open circuited. Similarly, an open neutral conductor 67 of the system which is being tested will be indicated by no deflection of the ammeter needle 36 during the foregoing test when the rotary switch pole tab 29' is in engagement with its contact 61.

An open circuit in the hot line of the distribution system being tested may be determined by turning the rotary switch 28 to place its pole tab 29' in engagement with its contact 76 so as to place the ground and neutral conductors of the system in series with each other and the ammeter 10 and across the test device electrical energy source battery 15. A deflection of the ammeter of slightly less than the reference deflection under these conditions indicates complete electrical circuitry through the neutral and grounding conductors of the system; while if no ammeter deflection is obtained with the rotary switch pole tab 29' in engagement with either its contact 56 or 61, but a deflection is obtained with the rotary switch pole tab 29' in engagement with its contact 76, an open hot conductor in the system being tested is indicated.

In order to check all outlets, these tests should be repeated by successively inserting the test cord plug in each outlet.

An electrically polarized outlet connection is indicated when a reading of substantially the reference value 35 is obtained when the rotary switch pole tab 29' is in engagement with its contact 56, although a normal reading or deflection of the ammeter is obtained when the rotary switch pole tab 29' is in engagement with its contact 61 during the foregoing tests with the lamp 78 turned on by its switch 79. If the ammeter reading for both positions of the rotary switch pole tab 29' in engagement with its contacts 56 and 61 during the foregoing tests in a deflection substantially equal to the reference deflection 35, a short circuit in the system being tested is indicated.

If a system which is undergoing test includes a fixture having several possible power circuits, such as a multiple light lamp fixture or a heating element having a plurality of selectable temperature positions, the different connections of the various circuits of the fixture can be tested by simply successively turning on each lamp of a light fixture or each power position of another device, such as a heating device. When this is done, the foregoing tests with the lamp 78 should be repeated for each different power consumption connection of the fixture and the correctness of the connections in the fixture will be indicated by the deflections of the ammeter. For example, when a plurality of lights of a multiple light fixture are turned on, the ammeter deflection should increase with an increase in the total wattage of the lights which are lit in the fixture. Similar changes in ammeter deflections for different energizations of a multiple connection heating element or similar device should similarly produce variations in the ammeter reading according to the increased power for the different connections of such a device or fixture. If the deflections are not in the correct proportions, a fault in the fixture or device is indicated, and the internal wiring of the fixture or device should be checked for a possible ground, short circuit, or incorrect polarity connection.

If the ammeter deflection with the light 78 turned on is slightly less than a reference reading 60, such as a deflection 60', a short circuit in some part of the system is indicated. For example, if, in the circuit illustrated in Fix. 4, a short circuit existed between the system hot conductor 74 in the outlet 51 and the neutral conductor 67, such a reading might be obtained if the test cord plug 43 is inserted in another outlet, such as in an outlet 44 or 44', in outlet position 45. In order to locate the position of this fault, the test cord plug 43 would be removed from the socket at position 45 and inserted into the next adjacent outlet socket 46 or 46' at position 47. If, in this position, the ammeter deflection is increased slightly toward the reference position 60, but is not yet equal to the reference deflection, this indicates that the position 47 is nearer to the fault than position 45. The test cord plug 43 then should be withdrawn from position 47 and inserted into the next adjacent outlet position, such as position 49 and in engagement with one of the sockets 48 or 48'. If, in this position, the deflection of the ammeter is still less than the reference deflection 60 but is greater than the last previous deflection, this indicates that the fault is nearer this outlet position than the former position. On the other hand, if this deflection is less than in the former position, it would indicate that the fault is nearer the last previous outlet and further from the present outlet position 49. If either of these conditions exists, the test cord plug 43 should be inserted in another outlet adjacent to position 49, such as an outlet 50 or 50' in position 51. Since the short circuit has been assumed to exist in this outlet position, the ammeter deflection should read exactly the value of the reference deflection 60, as the short circuit in this position of the system is equivalent to the original short circuit of the test cord plug 43 when the short circuited female plug 42 was connected to the test cord plug 43 in initially zeroing the test instrument. Such a reading on the ammeter indicates that this outlet is the exact position of the short circuit fault. A similar procedure may be followed whenever the ammeter deflection of the foregoing type is indicated and the position of the fault can thus be readily located.

The reason for the different readings of the ammeter when the test cord plug 43 is inserted in the different outlet sockets, is that the resistance of the conductors of a system being tested from the fault to the socket in which the test cord plug is inserted is added to the resistance of the test cord and therefore results in a lesser current in the circuit which produces a lesser ammeter deflection than the reference deflection. Whenever the test cord plug is in a socket other than at the position of the short circuit fault, the greater the distance from such a fault, the greater the resistance and the greater the difference between the ammeter reading and the reference reading.

Each outlet in the system being tested should be individually checked by insertion of the test cord plug 43 into each outlet of the system. In each instance, the rotary switch 28 should be turned with the pole tab 29' in engagement with the rotary switch contact 56, so as to test the outlet circuit through its hot conductor contact terminal 71 and its ground conductor contact terminal 69, which completes a circuit through the instrument to the rotary switch contact 57 and its pole tab 30' with its pole 30 in engagement with the switch contact 31. The rotary switch 28 should then be turned so that its pole tab 29' engages its contact 61 which will test the circuit through the hot line connected to the outlet contact terminal 71 and the neutral outlet contact 70 circuit, which is connected through the test cord to rotary switch contact 58 engaged by pole tab 30' in this position of the switch, which completes an electrical circuit through the switch pole 30 and its contact 31 to the electrical battery source 15.

If the ammeter deflection is slightly less than the reference deflection when the rotary switch pole tab 29' is in engagement with its contact 56, and is slightly greater than when tab 29' is in engagement with contact 61, a short circuit fault is indicated as existing between the hot conductor and the ground conductor 65. However, if a greater ammeter deflection is observed when rotary switch pole tab 29' is in engagement with its contact 61, a short circuit fault is indicated as being between the hot conductor and the neutral conductor 67. That is, the greatest ammeter deflection observed when rotary switch pole tab 29' is engaged and disengaged between its contacts 56 and 61, indicates a short circuit fault to exist between the conductors corresponding to the rotary switch connections having the greater deflection.

A test similar to the foregoing tests with reference to the sockets and appliances or fixtures connected to the side of a system between hot conductor 74 and the neutral conductor 67 should also be made of all of the fixtures, as well as outlets, such as outlet 81 connected to the other low voltage side of the system between the system neutral conductor 67 and the other hot conductor 77 electrically connected to outlet contact 82. The outlets on this side of the system are also provided with a third contact 69 connected to the common ground 65 of the system, and any outlet boxes, such as box 81' for the outlet 81, are connected in any suitable manner, as by a screw 68, to the ground conductor 65 of the system. Generally, this side of the system preferably will have substantially the same number of outlets as the other side of the system so that the determination of the location of the faults would be performed in the same manner for this side of the system as has been previously described.

Power devices, such as electric ranges, water heaters, fans, and so forth, are generally supplied by 230-volt supply lines, such as hot lines 74 and 77 of the system illustrated in FIG. 4. For illustrative purposes a heating resistance element 83 of an electric appliance 84, such as an electric range or hot water heater, is connected to the power source through a plug 85 having power line plug contacts 86 and 87 and a ground prong 88, which are respectively adapted to be inserted into complementary female socket contacts 89, 90, and 69 of a socket 91. The outlet box for the socket 91 also should be suitably connected to the ground line 65 of the system, as by a screw 68, connected to the ground line.

In order to check the circuit continuity of the heating element 83, the hot line 77 of the system should be shorted to the ground 65 or neutral 67 of the system. This can readily be done by a three-way shorting switch, such as that shown in FIG. 5, which comprises a plug 92 having a hot line prong 93, a neutral line proing 94, and a ground line prong 95, respectively, connected to a switch pole 96 and switch contacts 97 and 98 of a three-way switch. The plug 92 may be inserted in the socket 81' and the three-way switch pole 96 closed on either the neutral switch contact 97 or the switch contact 98, thereby shunting or connecting the hot line 77 to the neutral or ground conductor of the system. A check should be made to determine that all circuit protective devices 64', such as conventional circuit breakers, are on, and that there is no jumper between lines 74 and 77. The general test cord plug 43 is then inserted in one of the sockets connected to the other hot line 74 of the system, such as any of the sockets 44–50'. The rotary switch 28 then is turned to place its pole tab 29' in engagement with its contact 56. If the ammeter deflection is substantially to a value slightly less than the reference deflection 60, it may indicate that there is a short circuit or ground fault in the heating element 83 or between the lines 74 and 77 connected thereto. Where the low voltage branches have previously been tested and found not to be grounded or shorted, he fault is clearly only in the circuit connected to the power equipment being tested or in the equipment itself.

In order to definitely determine whether there is a fault in the heating element, the general test cord plug 43 should be removed from the socket in which it was inserted and inserted into another socket, as if the plug accidentally had been inserted into a socket connected to the system hot line 77, such as in socket 81', a reference deflection of the ammeter also would have resulted. It may be necessary to try several outlets in the system before an outlet connected to the hot line 74 is plugged into for this continuity test. However, if outlets on one side of the system have been checked previously to the test of the high voltage appliance unit or element 83, it is simply necessary to make sure that the test cord plug 43 is inserted into one of the sockets in the side of the system which was thus previously tested and that the three-way shorting switch socket 92 is inserted into a socket in the side of the system which was not tested by the previous outlet tests. If, however, there is a relatively small deflection of the ammeter needle, such as deflection 80, it indicates that the circuit through the heating element 83 is complete and that the connections thereto are correct.

In addition to checking for circuit continuity of power equipment, a check should be made as to the grounding of the power equipment housing or casing, such as the casing of a hot water heater or the frame of an electric range. Such a casing or frame of an appliance 84 should be grounded and connected directly to its ground plug prong 88, as by a conductor 99. In making this check, the ammeter switch 21 should be closed and the rotary switch 28 turned to its open circuit position with its pole tab 29' in engagement with its contact 31. A probe plug 100 is inserted in a suitable jack 101, connected between the terminal 11' of the electric light 11, which is connected to the negative ammeter terminal, and the variable resistance 34. One line 102 of a probe is grounded by clamping a circuit terminal clamp 103 to a ground of the system, while another line 104 of the probe 103 is connected to the casing or frame of the appliance 84 by touching it with the probe 105. In making this connection, care must be taken to assure that the probe actually contacts the metal of the casing or frame and is not insulated therefrom by an insulating paint or coating on the surface of the casing or frame. If the casing or frame of the appliance is properly grounded, the electric light 11 and ammeter 10 will be energized. Otherwise, light 11 and ammeter 10 will not be energized, indicating an open grounding conductor.

Where a system to be tested is connected to a power source, the continuity and polarity of the system through its various fixtures, appliances, and outlets, can also readily be tested by the present embodiment of the improved electrical testing device by inserting the general test plug 43 into each outlet connected to one hot line and neutral of the system, while turning the rotary switch 28 to its off position with its pole tab 29' in engagement with its contact 31 and opening the ammeter switch 21. The main power switch 64 in the main bus then is closed on the power supply lines 61, 62, and 63. The double-pole double-throw switch 16 is then closed with its poles 17 and 18 in engagement respectively with its contacts 19' and 20'. If electric lights 12 and 13 are turned on and light 14 is off, all of the circuits connected to the outlet in which the plug 43 has been inserted are correct. If the lights 12 and 14 are turned on and the light 13 is off, the neutral conductor 67 and the hot line conductor 74 are connected in reverse to the socket in which the plug 43 is inserted. If the light 12 is turned on and both of the lights 13 and 14 are dimly lit, the connection to the ground line 68 is open. If the light 13 is turned on and both of the lights 12 and 14 are dimly lit, the connection to the neutral conductor is open circuited. If none of the lights is lit, either (1) the connection to the hot line conductor 74 is open circuited, or (2) both the neutral and ground conductors may be open circuited. With test cord 37 remaining in contact with said outlet, turn switch 16 to "center" off position and turn rotary switch so that pole tab 29' is in engagement with its contact 76 and pole tab 30' in engagement with its contact 59, connecting the neutral and grounding conductors in series with battery source 15. Move switch 16 from off position so that switch contacts 17 and 18 engage switch terminals 19 and 20. Close switch 21. If the neutral and grounding conductors have continuity from said outlet to the system distribution panel, a complete circuit will be provided from battery 15 which will energize lamp 11 and ammeter 10. The fault then is an open hot conductor. If, however, no neutral and ground continuity is indicated, the following test should be made. Rotary switch 28 and ammeter switch 21 may be turned to the off position. Tester cord 37 should remain connected to the original outlet, and switch 16 should be turned to make engagement with switch contacts 19' and 20'. Push button switch 106 is closed so as to close a circuit through a neon light 107 to metal screw 108. While push button 106 is closed, the operator touches the exposed metal head of screw 108. If neon light 107 gives a noticeable glow, it indicates that the hot line of the outlet connected to test cord 37 is energized and that the neutral and grounding conductors are both open. Otherwise, if light 107 does not glow, the outlet is non-energized or "dead." This test can be repeated by inserting the general test cord plug 43 into each of the outlet sockets of the system. If a fault is discovered by this test of the system energized by the external power source, the main switch 64 of the bus should be opened and the preceding test procedure for checking the exact location of the fault should be followed in order to obtain the correct location of the fault.

While a particular embodiment of this invention has been illustrated and described, modifications thereof will occur to those skilled in the art. It is to be understood, therefore, that this invention is not to be limited to the exact details disclosed.

I claim:

1. A portable electrical testing apparatus for testing energized and non-energized multiple conductor electrical systems comprising a test cord having at least three conductors, means for connecting a first of said test cord conductors to a ground, means for connecting a second of said test cord conductors to a power conductor of the system under test, means for connecting a third test cord conductor to a neutral conductor of the system under test, a test instrument having a first circuit for testing an energized system and a second circuit for testing a non-energized system, said instrument having switch means for selectively connecting said second and third test cord conductors to said first and second circuits, said first circuit including a plurality of first indicator means connected to said first test cord conductor and selectively connected to said second and third test cord conductors by said switch means, said first circuit including second indicator means selectively connected to said second test cord conductor by said switch means so that when said test cord is connected to an electrical system said plurality of first indicator means indicate the continuity and polarity of the conductors of said electrical system when said system is energized and said second indicator means indicates that the power conductor of said electrical system is energized or non-energized, said second circuit including a conductor selector switch connected to said first test cord conductor and to said switch means for selectively establishing a series circuit between any two conductors of said test cord, a source of power for providing current flow to said selected conductors through said selector switch, and current measuring and indicating means for measuring current flow through said selected conductors, whereby when said test cord is connected to a non-energized multiple conductor electrical system said second circuit indicates the presence and location of faults in the electrical conductors of said non-energized system.

2. An electrical testing apparatus as defined in claim 1 in which said current measuring and indicating means includes an electric light indicator and a current ammeter which is selectively connected in parallel with said electric light indicator thereby giving visual indication of the continuity of said non-energized electrical system being tested with relative current levels indicated by said ammeter to indicate the presence and location of loose connections and short circuit faults.

3. An electrical testing apparatus as defined in claim 1 for testing multiple conductor electrical systems having a high voltage line, a neutral line, and a ground line and in which said first test cord conductor is connected to said ground line and said second and third test cord conductors are connected to said high voltage line and said neutral line, respectively, in which said first indicator means of said first circuit for testing an energized electrical system includes three electrical lights each with two terminals, wherein said switch means is selectively positioned to test said energized electrical system thereby establishing a circuit between said second and third test cord conductors of said test cord and said electric lights in which said second test cord conductor of said test cord is connected in series to one terminal each of a first and second of said three electric lights, and said third test cord conductor is connected in series to the other terminal of said first electric light and to one terminal of the third of said three electric lights, said first test cord conductor of said test cord connected in series to the second terminal of said second and third of said three electric lights, thereby the three electric lights are connected in series with each other, and whereby relative energized illumination of said three electric lights on connection of said test cord to an energized three conductor electrical system being tested indicates the continuity and polarity of the system.

4. An electrical testing apparatus as defined in claim 1 in which said second indicator means of said first circuit for testing an energized electrical system includes a neon light, a circuit closing switch, and ground means connected in series through said switch means with the second test cord conductor of said test cord, whereby closing said circuit closing switch and grounding said ground means gives a visual indication of continuity of said high voltage line by illumination of said neon light.

5. An electrical testing apparatus as defined in claim 1 for testing multiple conductor electrical systems of the type having a power conductor and a neutral conductor in which said first test cord conductor is grounded and said second and third test cord conductors are connected to said power conductor and said neutral conductor, respectively, in which said first indicator means of said first circuit for testing an energized electrical system includes three electric lights each with two terminals, wherein said switch means is selectively positioned to test said energized electrical system thereby establishing a circuit between said second and third test cord conductors of said test cord and said three electric lights in which said second test cord conductor of said test cord is connected in series to one terminal each of a first and second of said three electric lights, and said third test cord conductor is connected in series to the other terminal of said first electric light and to one terminal of the third of said three electric lights, said first test cord conductor connected in series to the second terminal of said second and third of said three electric lights, thereby the three electric lights are connected in series with each other, and whereby relative energized illumination of said three electric lights on connection of said test cord to an energized two conductor electrical system being tested indicates the continuity and polarity of the system.

6. An electrical testing apparatus as defined in claim 1 wherein said second circuit includes means to selectively adjust the current through said second circuit for testing non-energized systems and said test cord, said means to selectively adjust the current including a first, second, and third inner connected series circuits, said first series circuit for adjusting the internal resistance of said second circuit including first and second variable resistors, said first variable resistor being connected in series with the positive terminal of said source of power and said current measuring and indicating means, said second variable resistor being connected in series with the negative terminal of the source of power and said first variable resistor and said measuring and indicating means through said conductor selector switch; said second and third series circuits for determining and balancing the resistance through said test cord and said second circuit for testing non-energized circuits being selectively established through a two-position selector switch, said second series circuit for determining and adjusting the resistance through said test cord and said second circuit comprising said first variable resistor, said conductor selector switch, said current measuring and indicating means, the first position of said two-position selector switch, said source of power, said switch means for selectively connecting said second and third test cord conductors to said first and second circuits, said test cord, and shorting means on the outer ends of said test cord; said third series circuit for balancing the resistance through said test cord and said second circuit being selectively established through the second position of said two-position selector switch and including said first and second variable resistors, said current measuring the indicating means, and said source of power.

7. An electrical testing apparatus as defined in claim 6 in which said third series circuit when opened through said two-position selector switch has means to indicate adequate grounding of electrical devices which are connected to the electrical system being tested, said means comprising a two-conductor probe having one conductor connected to a ground and the other conductor connected to the frame of the electrical device being tested, said two-conductor probe being connected as its other end across said third series circuit thereby bypassing said two-position selector switch and closing a circuit through said current measuring and indicating means, said first and second variable resistors, and said source of power.

* * * * *